United States Patent [19]

Hisajima et al.

[11] Patent Number: 5,577,555

[45] Date of Patent: Nov. 26, 1996

[54] HEAT EXCHANGER

[75] Inventors: Daisuke Hisajima, Ibaraki-ken; Akira Nishiguchi, Ushiku; Tomihisa Ohuchi, Tsukuba; Saburo Tsukada, Tsuchiura, all of Japan

[73] Assignees: Hitachi, Ltd.; Hitachi Cable, Ltd., both of Tokyo, Japan

[21] Appl. No.: 192,287

[22] Filed: Feb. 4, 1994

[30] Foreign Application Priority Data

Feb. 24, 1993 [JP] Japan .................. 5-035170

[51] Int. Cl.$^6$ .................. F28F 13/02; F28F 1/42
[52] U.S. Cl. .............. 165/133; 165/109.1; 165/179; 165/DIG. 515; 165/DIG. 529
[58] Field of Search .................. 165/133, 179, 165/181, 109.1

[56] References Cited

U.S. PATENT DOCUMENTS

| | | | |
|---|---|---|---|
| 4,470,452 | 9/1984 | Rhodes | 165/179 X |
| 4,690,211 | 9/1987 | Kuwahara et al. | 165/184 X |
| 4,715,436 | 12/1987 | Takahashi et al. | 165/133 |
| 5,353,865 | 10/1994 | Adiutori et al. | 165/133 |

FOREIGN PATENT DOCUMENTS

| | | | |
|---|---|---|---|
| 3205309 | 8/1983 | Germany | 165/109.1 |
| 129197 | 8/1983 | Japan . | |
| 71083 | 5/1984 | Japan . | |
| 6595 | 1/1986 | Japan . | |
| 242795 | 10/1987 | Japan | 165/179 |
| 134180 | 5/1989 | Japan . | |
| 236097 | 8/1992 | Japan . | |
| 1772575 | 10/1992 | U.S.S.R. | 165/109.1 |
| 102 | of 1887 | United Kingdom | 165/179 |
| 2159265 | 11/1985 | United Kingdom | 165/109.1 |

*Primary Examiner*—Leonard R. Leo
*Attorney, Agent, or Firm*—Antonelli, Terry, Stout & Kraus

[57] ABSTRACT

Heat exchanger has a first surface on which a first fluid flows and a second surface on which a second fluid flows, at least one of the first and second surfaces has at least two projections and a bottom therebetween, and an imaginary line on the bottom along a shortest distance between the projections adjacent to each other is prevented from extending along an imaginary face substantially parallel to a main flow direction of one of the first and second fluids which flows over the bottom.

4 Claims, 13 Drawing Sheets

HEAT EXCHANGER

BACKGROUND OF THE INVENTION

Field of the Invention

The present invention relates to a heat exchanger means, particularly, a heat exchanger pipe preferable for an use in absorption heat pump apparatus.

Published of Japanese Unexamined Patent Application Hei-1-134180 discloses a conventional heat transmission pipe for an absorber, which pipe has a plurality of fins extending in a circumferential direction of the pipe and separated from each other in a longitudinal direction of the pipe, and a plurality of grooves extending in the longitudinal direction between the fins divided in the circumferential direction.

Each of Publications of Japanese Unexamined Patent Application Shou-61-6595 and Japanese Unexamined Utility Model Application Shou-59-71083 discloses another conventional heat transmission pipe for heat exchanger whose outer surface has dents and whose inner surface has projections. Each of Publications of Japanese Unexamined Patent Application Hei-4-236097 and Japanese Unexamined Patent Application Shou-58-129197 discloses another conventional heat transmission pipe for use in a heat exchanger whose outer surface has dents.

SUMMARY OF THE INVENTION

An object of the present invention is to provide a heat exchanger in which a surface thereof has at least two projections and a fluid is directed effectively in a direction substantially perpendicularly to a general or main flow direction of the fluid so that a churning of the fluid is accelerated over the surface.

According to the present invention, a heat exchanger for heat exchange between first and second fluids, comprises, a first surface on which the first fluid flows; and a second surface on which the second fluid flows; wherein at least one of the first and second surfaces has at least two projections and a bottom therebetween, and an imaginary line on the bottom along a shortest distance between the projections adjacent to each other is prevented from extending along an imaginary face substantially parallel to a main flow direction of one of the first and second fluids which flows over the bottom.

Since the imaginary line included by a surface of the bottom along the shortest distance between the projections adjacent to each other is prevented from extending along the imaginary face substantially parallel to the main flow direction of one of the first and second fluids which flows over the bottom, in other words, since the surface of the bottom is prevented from extending along the imaginary face substantially parallel to the main flow direction of one of the first and second fluids which flows over the bottom and simultaneously along the imaginary shortest distance line between the projections adjacent to each other, the one of the first and second fluids is prevented from flowing continuously and constantly in the main flow direction on the bottom and is directed effectively in a direction substantially perpendicular to the main flow direction so that a fluidal churning over the bottom is accelerated and the heat exchange between the first and second fluids is improved.

The bottom may curve continuously or be bent discontinuously, along the imaginary line passing the shortest distance between the projections. When the heat exchanger has generally a rectangular tube-shape, the imaginary face has a substantially rectangular-column shaped. When the heat exchanger is generally cylindrical tube shaped, the imaginary face is substantially cylindrical column shaped. When the heat exchanger is generally tube-shaped, the main flow direction may be substantially parallel to a longitudinal direction of the heat exchanger, or may be substantially perpendicular to the longitudinal direction of the heat exchanger.

A depth of a part of the bottom along the imaginary line relative to tops of the projections may be smaller than a depth of the other part of the bottom away from the imaginary line relative thereto. A distance between the first and second surfaces at the tops of the projections may be larger than a distance therebetween at the part of the bottom along the imaginary line. The distance between the first and second surfaces at the tops of the projections may be smaller than a distance therebetween at the part of the bottom away from the imaginary line.

Another one of the first and second surfaces may have at least two dents and a partition wall therebetween, and a height of a part of the partition wall relative to bottoms of the dents along an imaginary shortest distance line on the partition wall between the dents adjacent to each other may be smaller than a height of the other part of the partition wall away from the imaginary shortest distance relative thereto.

Each of the projections may be substantially hemispherical and symmetrical relative to a top thereof. The imaginary line may pass on the tops of the substantially hemispherical and symmetrical projections. The heat exchanger may be tube-shaped, and a length of each of the projections in a longitudinal direction of the heat exchanger means may be larger than a length thereof in a direction substantially perpendicular to the longitudinal direction.

DETAILED DESCRIPTION OF PREFERRED EMBODIMENTS

A surface of a heat exchange wall 21 has a plurality of dents 20 for decreasing a thickness of a fluid film thereon and increasing a surface area of the fluid film. A depth hd of the dents 20 is smaller than a diameter Dd thereof. When the heat exchange wall 21 is generally planar, the dents 20 are arranged along straight or curved axes. When the heat exchange wall 21 is generally curved to form a tube-shape, the dents 20 are arranged along at least one helical axis or straight axis parallel or perpendicular to a longitudinal direction of the tube with a constant or regularly varied distance between the dents 20. An inner surface of each of the dents 20 is smoothly curved, and an opening area thereof varies in a depth direction thereof. A reverse surface of the heat exchange wall 21 has projections 29 with respective smooth surfaces, and preferably, the depth of the dents 20 is larger than a thickness t of the heat exchange wall 21. An area of a part of the surface of the heat exchange wall 21 other than the dents 20 is not more than 50% of a whole area of the surface of the heat exchange wall 21.

Since a thickness of the fluid film in the dents 20 is large so as to increase a heat transmission resistance of the fluid film when the depth of the dents 20 is large in comparison with an opening diameter of the dents 20, the depth of the dents 20 is small in comparison with an opening diameter of the dents 20 in the present invention so that the thickness of the fluid film in the dents 20 is smaller to decrease the heat transmission resistance of the fluid film. Further, a substance diffusion or absorption in the fluid film is accelerated, the fluid film is constantly spread over the heat exchange wall 21 in the longitudinal direction and the fluid film is effectively directed from the bottom of the dents 20 toward the outside thereof by a surface tension of the fluid film.

Figure 1:
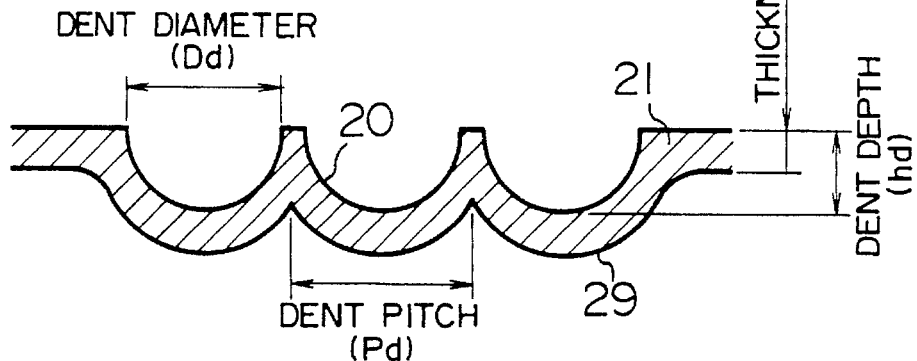
FIG. 1 is a cross-sectional view showing a heat exchange wall according to the present invention.
Figure 2:
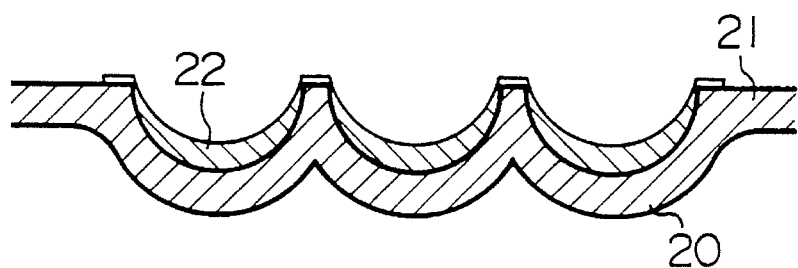
FIG. 2 is a cross-sectional view showing a liquid film on the heat exchange wall of FIG. 1.
Figure 3:
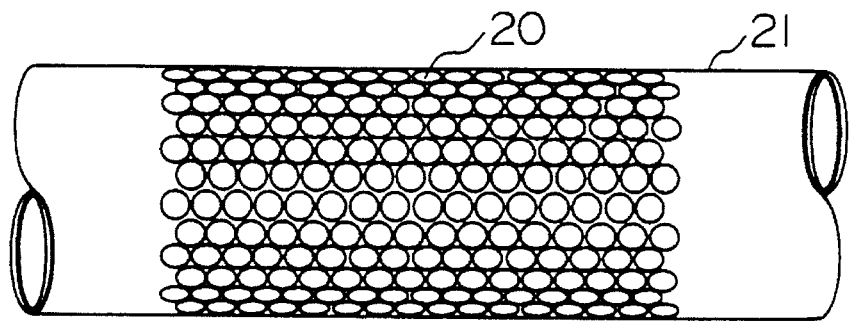
FIG. 3 is a schematic view showing a heat exchange tube according to the present invention.
Figure 4:
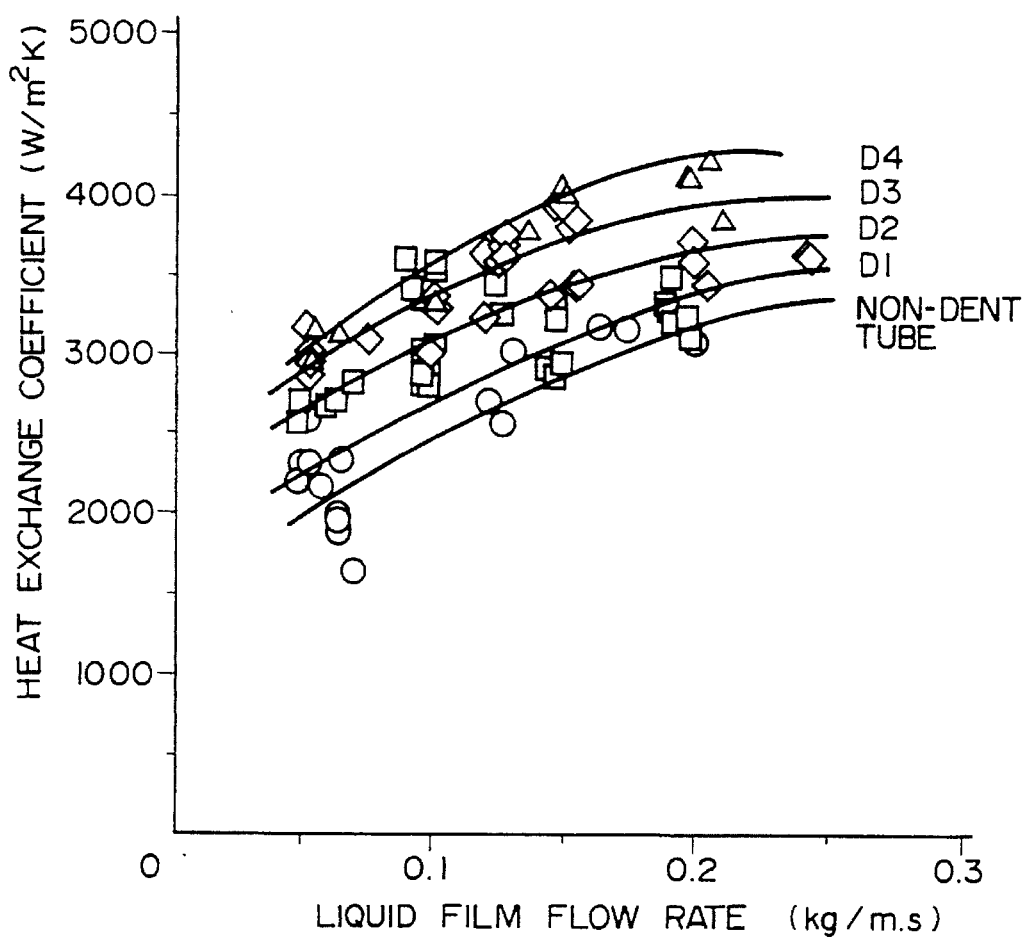
FIG. 4 is a diagram showing a relation between a liquid film flow rate, a heat exchange coefficient and a dent shape.
Figure 5:
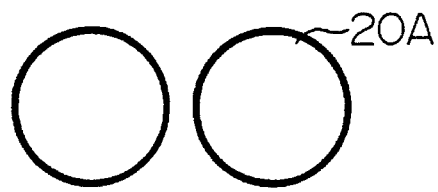
FIG. 5 is a schematic front view showing dents on a heat exchange wall according to the present invention.
Figure 6:
FIG. 6 is a cross-sectional view of the heat exchange wall of FIG. 5.
Figure 7:
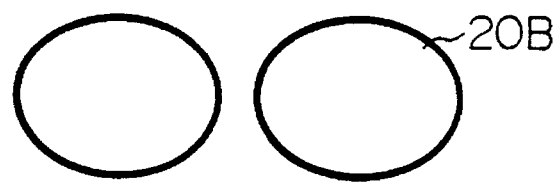
FIG. 7 is a schematic front view showing the other dents on another heat exchange wall according to the present invention.
Figure 8:
FIG. 8 is a cross-sectional view of the heat exchange wall of FIG. 7.
Figure 9:
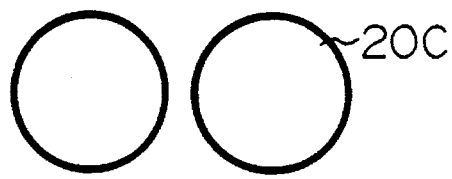
FIG. 9 is a schematic front view showing the other dents on another heat exchange wall according to the present invention.
Figure 10:
FIG. 10 is a cross-sectional view of the heat exchange wall of FIG. 9.
Figure 11:
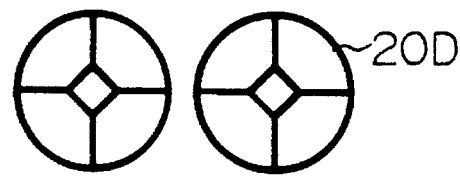
FIG. 11 is a schematic front view showing the other dents on another heat exchange wall according to the present invention.
Figure 12:
FIG. 12 is a cross-sectional view of the heat exchange wall of FIG. 11.
Figure 13:
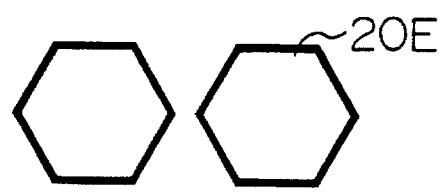
FIG. 13 is a schematic front view showing the other dents on another heat exchange wall according to the present invention.
Figure 14:
FIG. 14 is a cross-sectional view of the heat exchange wall of FIG. 13.
Figure 15:
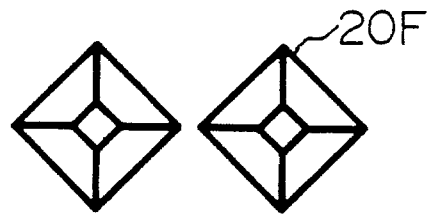
FIG. 15 is a schematic front view showing the other dents on another heat exchange wall according to the present invention.
Figure 16:
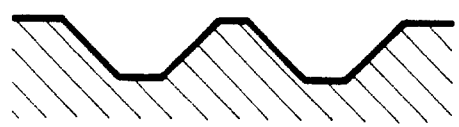
FIG. 16 is a cross-sectional view of the heat exchange wall of FIG. 15.
Figure 17:
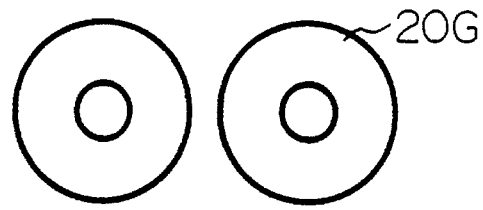
FIG. 17 is a schematic front view showing the other dents on another heat exchange wall according to the present invention.
Figure 18:
FIG. 18 is a cross-sectional view of the heat exchange wall of FIG. 17.
Figure 19:
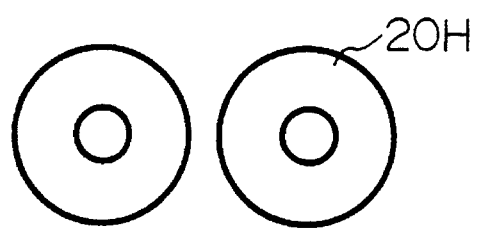
FIG. 19 is a schematic front view showing the other dents on another heat exchange wall according to the present invention.
Figure 20:
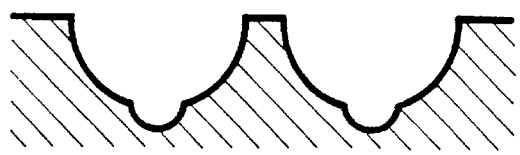
FIG. 20 is a cross-sectional view of the heat exchange wall of FIG. 19.
Figure 21:
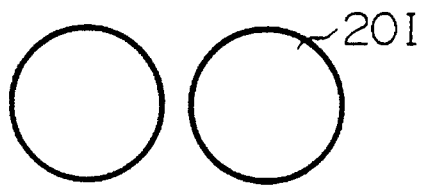
FIG. 21 is a schematic front view showing a combination of dent and projection on another heat exchange wall according to the present invention.

As shown in FIG. 4 and the below table, a heat exchange coefficient of each heat exchange tube with the dents is improved by more than 40% in comparison with that of a heat exchange tube without the dents, and it is preferable for the dents to have a depth of about 1 mm.

| Tube | Dent Depth | Dent Diameter | Dents Number (per lap) | Area Increase Rate |
| --- | --- | --- | --- | --- |
| D1 | 0.48 mm | 1.18 mm | 42 | 1.432 |
| D2 | 0.60 mm | 1.39 mm | 36 | 1.491 |
| D3 | 0.72 mm | 1.59 mm | 31 | 1.530 |
| D4 | 0.90 mm | 1.99 mm | 25 | 1.534 |

Figure 22:
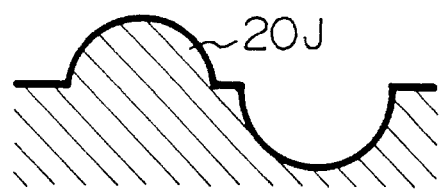
FIG. 22 is a cross-sectional view of the heat exchange wall of FIG. 21.
Figure 23:
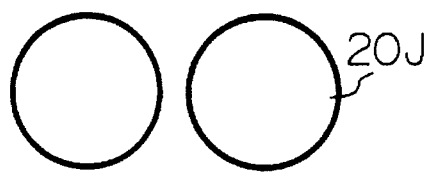
FIG. 23 is a schematic front view showing projections on another heat exchange wall.
Figure 24:
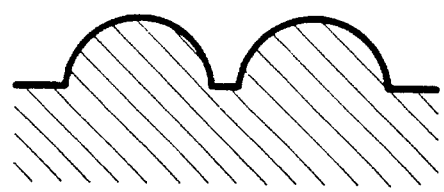
FIG. 24 is a cross-sectional view of the heat exchange wall of FIG. 23.
Figure 25:
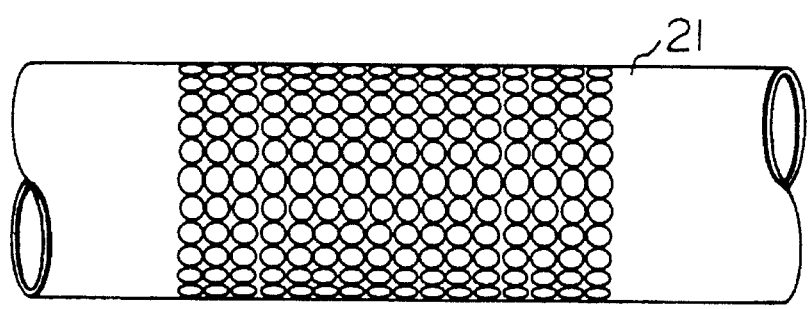
FIG. 25 is a schematic view showing another heat exchange tube according to the present invention.
Figure 26:
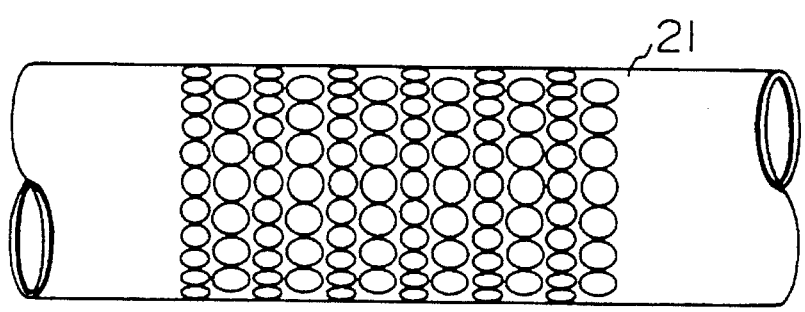
FIG. 26 is a schematic view showing another heat exchange tube according to the present invention.
Figure 27:
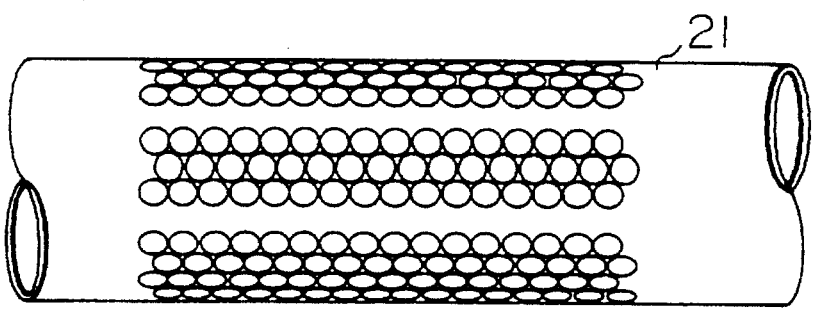
FIG. 27 is a schematic view showing another heat exchange tube according to the present invention.
Figure 28:
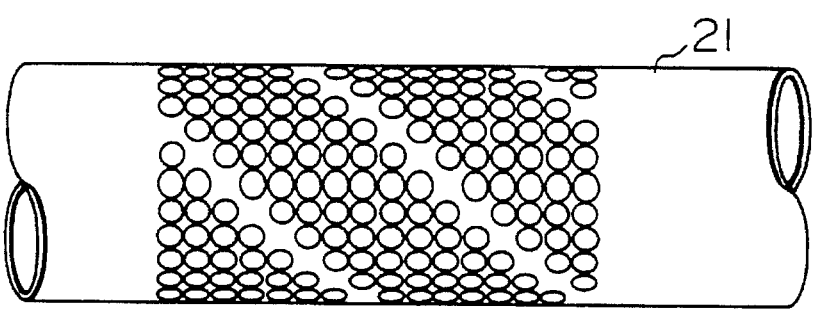
FIG. 28 is a schematic view showing another heat exchange tube according to the present invention.
Figure 29:
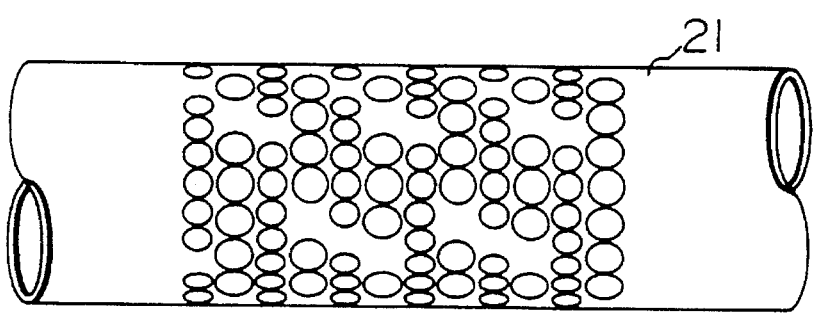
FIG. 29 is a schematic view showing another heat exchange tube according to the present invention.
Figure 30:
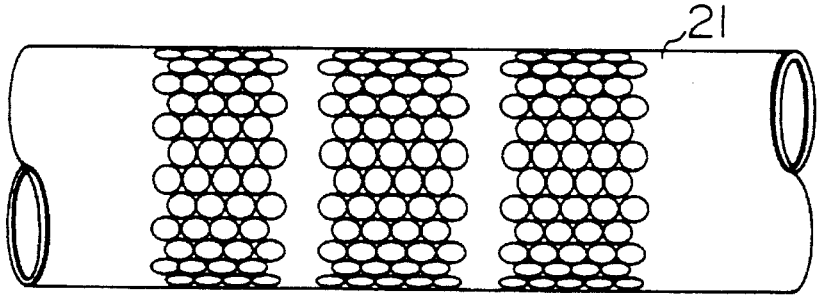
FIG. 30 is a schematic view showing another heat exchange tube according to the present invention.
Figure 31:
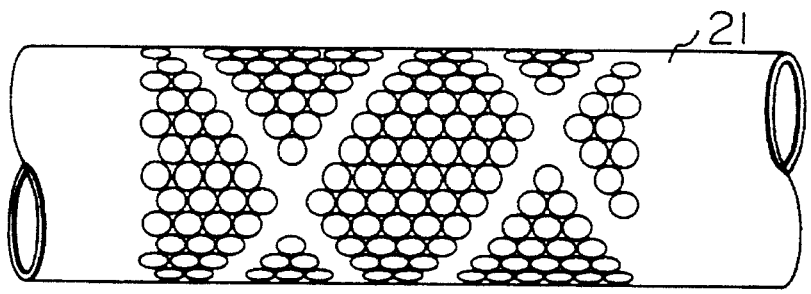
FIG. 31 is a schematic view showing another heat exchange tube according to the present invention.
Figure 32:
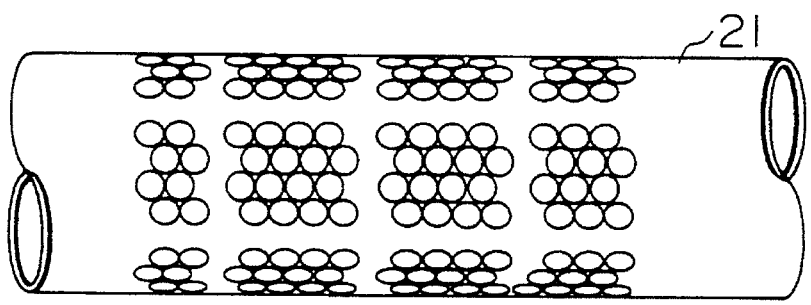
FIG. 32 is a schematic view showing another heat exchange tube according to the present invention.
Figure 33:
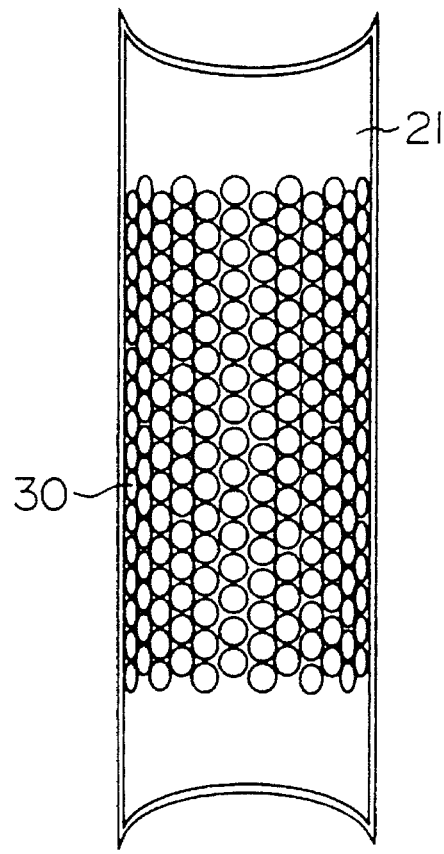
FIG. 33 is a partially cross-sectional schematic view showing an inner surface having projections in another heat exchange tube according to the present invention.

The dents 20 may have various shapes as indicated by reference numerals 20A–20I in FIGS. 5–21, and the heat exchange wall 21 may include projections 20J as shown in FIGS. 22 and 23. Sizes, arrangement, shapes and/or diameters of the dents 20 may be changed as shown in FIGS. 25–32. Non-dent part on the heat exchange wall 21 accelerates a spread of the fluid along the non-dent part. As shown in FIG. 33, the heat exchange wall 21 with dents 30 may be arranged at an inner side of the heat exchange tube, when the longitudinal direction of the heat exchange tube is oriented vertically and the liquid flows down on the inner side of the heat exchange tube.

Figure 37:
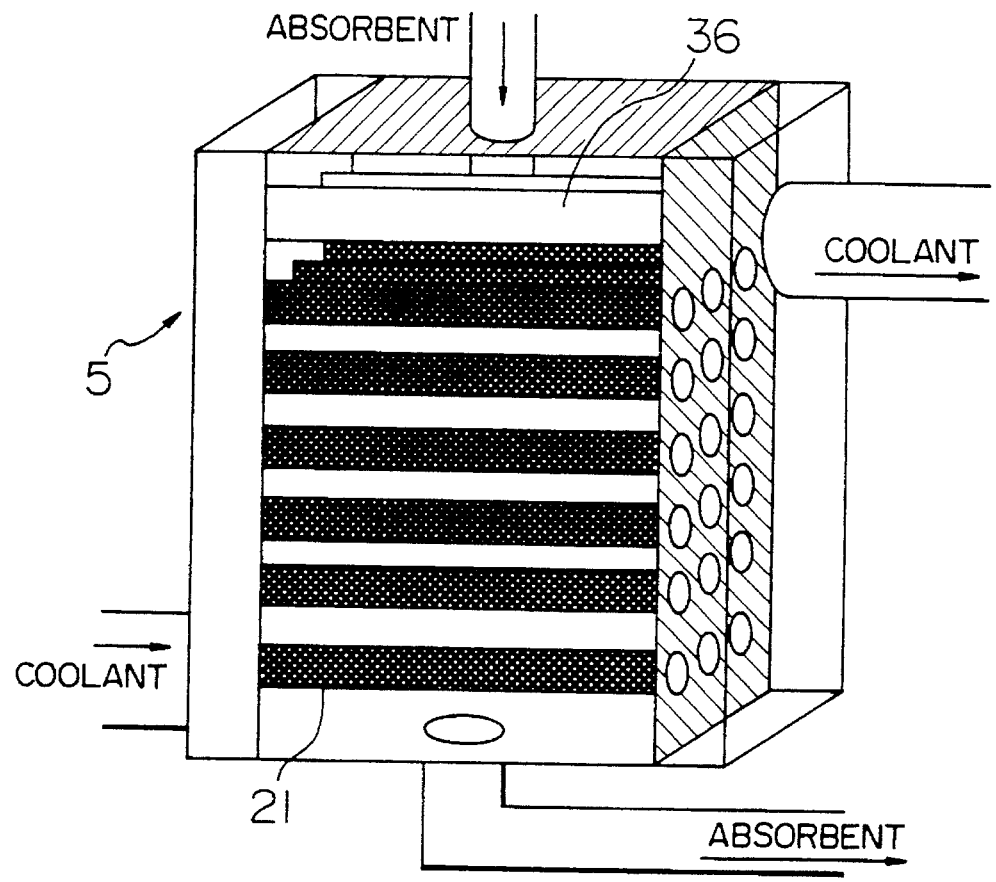
FIG. 37 is a schematic view showing an absorber in which heat exchange tubes according to the present invention are used.
Figure 38:
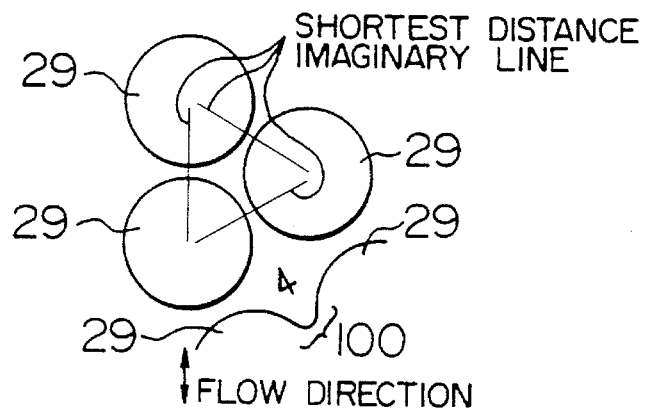
FIG. 38a is a schematic view showing a projection arrangement and FIG. 38b is a schematic view showing a bottom shape along a shortest distance imaginary line according to the present invention, FIG. 38 showing the combined views.
Figure 38A:
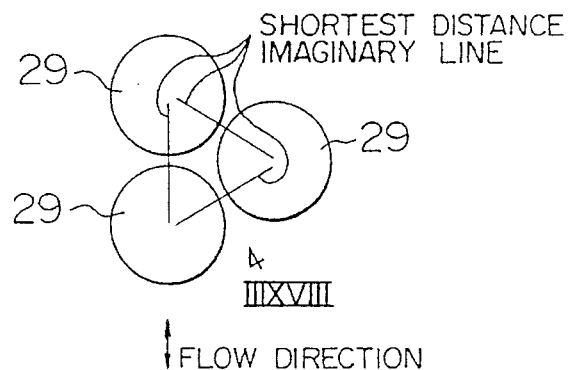
Figure 38B:
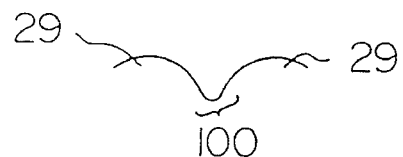
Figure 39A:
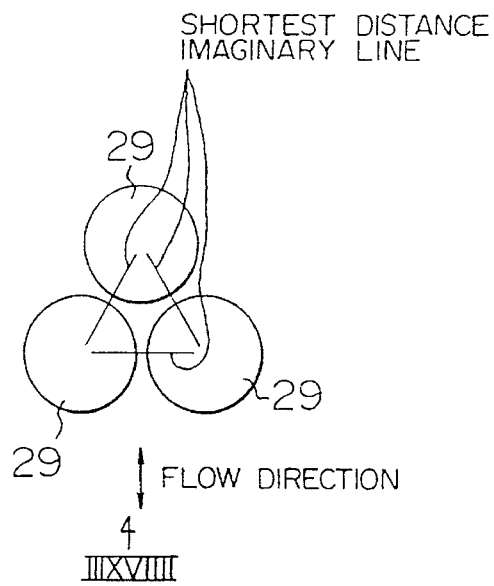
FIG. 39a is a schematic view showing another projection arrangement and FIG. 39b is a schematic view showing a bottom shape along the shortest distance imaginary line according to the present invention, FIG. 39 showing the combined views.
Figure 39B:
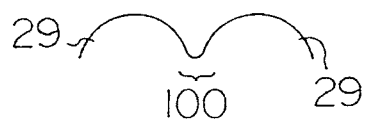
Figure 39:
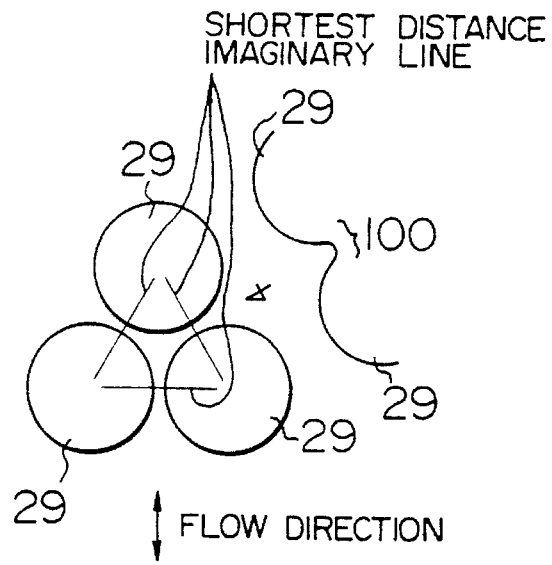

The above described heat exchange tubes may be used in a heat exchanger in which a liquid sprinkler is arranged at a vertically upper or horizontally lateral side of the heat exchange tubes in which coolant flows as shown in FIG. 37 so that the liquid as absorbent flows down on the heat exchange walls 21 of the heat exchange tubes to form the liquid film thereon to perform the absorption and heat exchange. When the liquid as absorbent is a lithium bromide aqueous solution including a surface activating agent, the depth of the dents 20 is preferably 0.6–2.0 mm, and a flow rate of the liquid per length of the heat exchange walls 21 is preferably 0.7–0.25 kg/(m×s).

Figure 34:
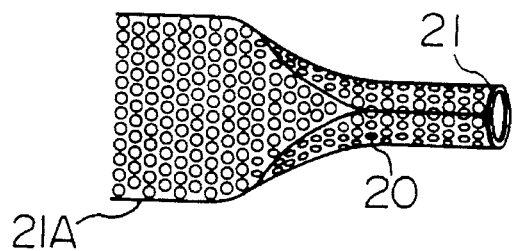
FIG. 34 is a schematic view showing a method for producing a heat exchange tube according to the present invention.
Figure 35:
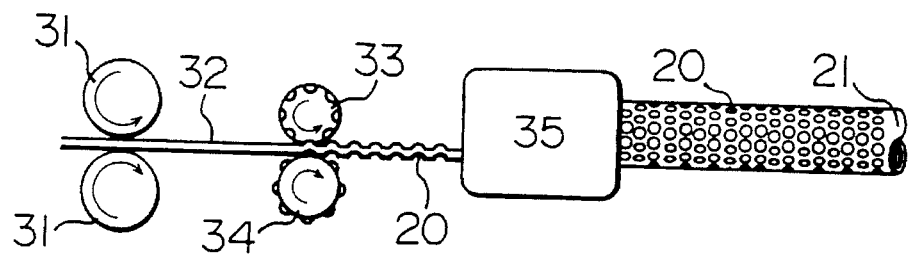
FIG. 35 is a schematic view showing an apparatus for producing a heat exchange tube according to the present invention.

As shown in FIG. 34, when the heat exchange tube is produced, the dents 20 are first formed on a planar or curved plate 21A, the plate 21A is rolled second, and subsequently lateral ends of the plate 21A are welded so that the plate 21 is changed into a heat exchange tube of closed cross-section. As shown in FIG. 35, the dents 20 may be formed by a pair of press rollers 33 and 34 on a workpiece plate 32 supplied by a pair of feed rollers 31, and the workpiece plate 32 may be changed into a heat exchange tube with the heat exchange walls 21 by rolling and welding device 35. If a positional relation between the press rollers 33 and 34 is reversed, the dents 20 can be formed on the inner surface of the heat exchange tube as shown in FIG. 33.

Figure 36:
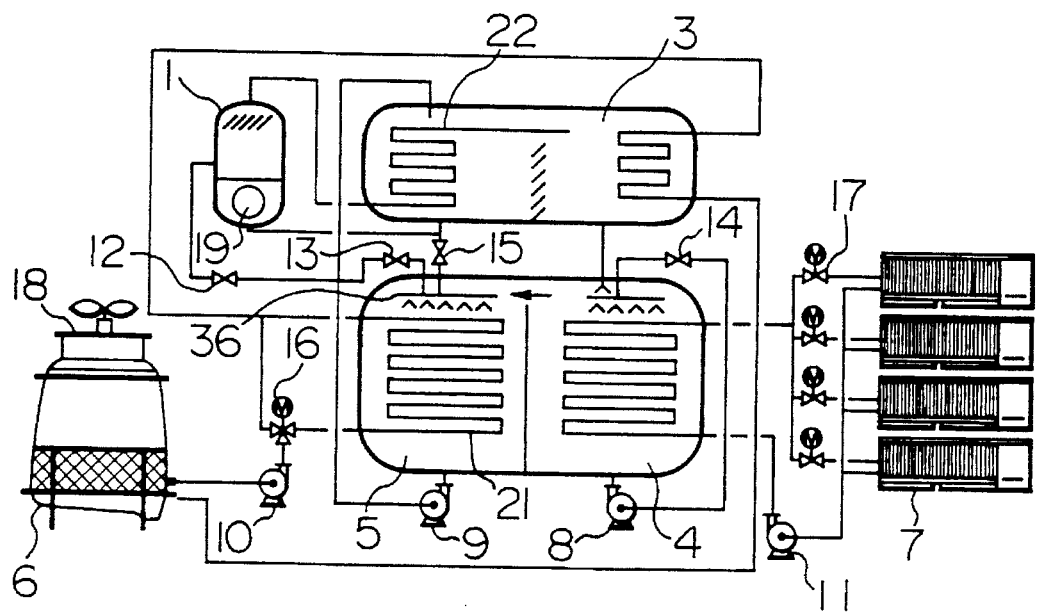
FIG. 36 is a schematic view showing an absorption air-conditioner.

In an absorption-type air conditioner as shown in FIG. 36, a refrigerant vapor generated in a high-temperature regenerator 1 flows into a low-temperature regenerator 2 to heat therein an absorbent supplied from an absorber 5 by an absorbent pump 9 so that the refrigerant vapor is further generated from the absorbent in the low-temperature regenerator 2 and the refrigerant vapor generated in the high-temperature regenerator 1 is cooled, condensed and liquefied in the low-temperature regenerator 2. The refrigerant liquefied in the low-temperature regenerator 2 flows into a condensor 3. The refrigerant vapor generated in the low-temperature regenerator 2 flows into the condensor 3 to heat a first cooling water in the heat exchange tubes and to be cooled, condensed and liquefied by the cooling water. The refrigerant liquefied in the low-temperature regenerator 2 and in the condensor 3 flows from the condensor 3 to an evaporator 4 to cool a second cooling water supplied into the heat exchange tubes by a cooling water pump 11 and to be heated or vaporized by the second cooling water. The cooled second cooling water flows into an indoor heat exchanger 7 through cooling water flow rate adjusting valves 17 so that the indoor heat exchanger 7 cools the air in room.

The refrigerant vapor generated in the evaporator 4 is absorbed by the absorbent flowing down on the heat exchange tubes 21 extending horizontally in an absorber 5, and heat energy generated by the absorption is removed by the first cooling water flowing in the heat exchange tubes 21 so that a temperature of the absorbent is decreased to maintain an absorption capacity of the absorbent. A part of the absorbent is fed by an absorbent pump 9 from the absorber 5 into the high-temperature regenerator 1 through a flow rate control valve 12 and into the low-temperature regenerator 2. A remaining part of the absorbent is returned into the absorber 5 through another flow rate control valve 13. The absorbent is heated by a boiler 19 in the high-temperature regenerator 1 to generate the refrigerant vapor to be supplied into the low-temperature regenerator 2, and the heated and condensed absorbent returns into the absorber 5 together with the absorbent heated and condensed in the low-temperature regenerator 2, through another flow rate control valve 15 and the sprinkler 36.

The first cooling water cooled in a cooling tower 6 is supplied to the condensor 3 through a cooling water pump 10. A part of the first cooling water is fed directly to the condensor 3 through a three-port flow rate control valve 16 with bypassing the absorber 5, another part thereof is fed to the condensor 3 through the three-port flow rate control valve 16 and the absorber 5. The first cooling water returns from the condensor 3 to the cooling tower 6. According to a load of the indoor heat exchanger 7, an opening degree of the three-port flow rate control valve 16 and a rotational speed of a fan 18 of the cooling tower 6 is adjusted.

Since the depth of the dents 20 is small, a thickness of the absorbent is small and the absorbent can spread on the heat exchange tube 21 in the longitudinal direction thereof so that the absorption capacity is improved.

As shown in FIGS. 38a–40, a bottom 100 between projections 29 on the heat exchange wall 21 does not extend along an imaginary shortest distance line between the projections 29 and an imaginary face substantially parallel to a main or general flow direction of fluid. The bottom 100 may have contact with the imaginary face at only one point along the imaginary shortest distance line, and extends away from the imaginary face and the one point along the imaginary shortest distance line to form a tapered terminating end space of the bottom 100 without a part thereof extending substantially parallel to the main or general flow direction of fluid along the imaginary shortest distance line. For example, when the heat exchange wall 21 forms a cylindrical shape, the imaginary face is cylindrical. For example, when the heat exchange wall 21 forms a rectangular-tube shape, the imaginary face is rectangular-column-shaped. When the heat exchange wall 21 is an inner surface of the heat exchange tube, the main or general flow direction of fluid is substantially parallel or equal to a longitudinal direction of the tube. The tapered terminating end of the bottom 100 without extending substantially parallel to the main or general flow direction of fluid along the imaginary shortest distance line directs effectively the fluidal flow in a direction substantially perpendicular to the main or general flow direction of fluid, that is, in a projection height direction, so that a churning of the fluid on the bottom is accelerated.

The bottom 100 may be curved continuously along the imaginary shortest distance line as shown in FIGS. 38a–40, alternatively, the bottom 100 may be bent discontinuously therealong. It is preferable for the bottom 100 to be prevented from extending on the imaginary face substantially parallel to the main or general flow direction of fluid along the imaginary shortest distance line.

Figure 40:
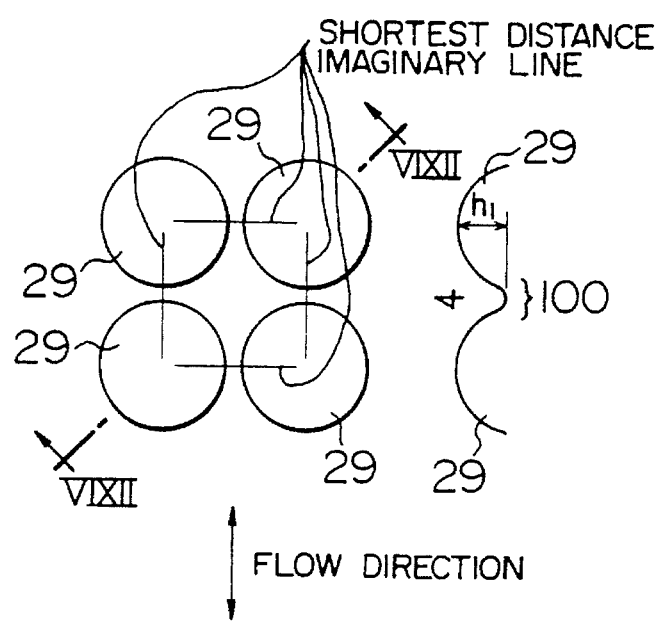
FIG. 40 is a schematic view showing another projection arrangement and bottom shape along the shortest distance imaginary line according to the present invention.
Figure 41:
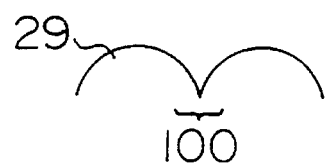
FIG. 41 is a schematic view showing another bottom shape along the shortest distance imaginary line according to the present invention.
Figure 42:
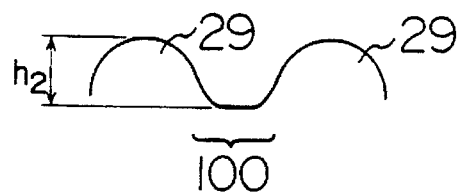
FIG. 42 is a cross-sectional view of another bottom shape taken along a line VIXII—VIXII in FIG. 40.
Figure 43:
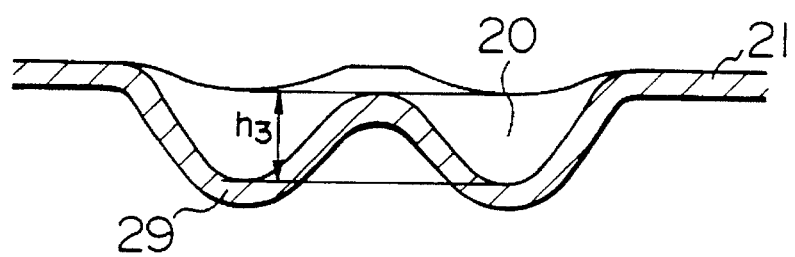
FIG. 43 is a partially cross-sectional view showing a height difference relative to a bottom of dent between a part of a partition wall along an imaginary shortest distance line and another part thereof away from the imaginary shortest distance line.
Figure 44:
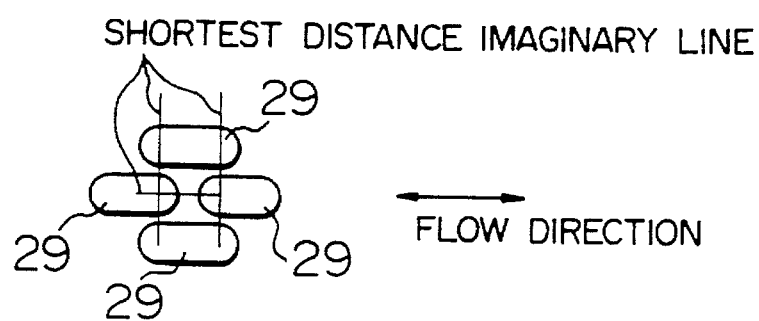
FIG. 44 is a schematic view showing another projection arrangement and bottom shape along the shortest distance imaginary line according to the present invention.

As shown in FIGS. 40 and 42, it is preferable for a depth or height h1 of the bottom 100 along the imaginary shortest distance line to be smaller than a depth or height h2 of another part of the bottom 100 away from the imaginary shortest distance line. As shown in FIG. 43, it is preferable for a depth or height h3 of partition walls between the dents 20 along another imaginary shortest distance line between the dents 20 adjacent to each other to be smaller than a depth or height of another part of the partition walls away from the another imaginary shortest distance line. As shown in FIG. 44, a length of the projections 29 in the longitudinal direction of the heat exchange tube 21 (for example, in the main or general flow direction of fluid in the inner side of the heat exchange tube 21) may be larger than that of the projections 29 in a direction substantially perpendicular to the longitudinal direction.

What is claimed is:

1. A heat exchanger for heat exchange between first and second fluids comprising:

a first surface on which the first fluid flows;

a second surface on which the second fluid flows; and wherein at least one of the first and second surfaces has at least two dents and a partition wall therebetween and a height of a part of the partition wall relative to a bottom of each of the dents on an imaginary line along a shortest distance on the partition wall between adjacent dents is smaller than a height on another part of the partition wall not along the imaginary line.

2. A heat exchanger for heat exchange between first and second fluids comprising:

a heat exchange wall having a first surface on which the first fluid flows and a second surface opposite said first surface on which the second fluid flows; wherein at least one of the first and second surfaces has at least two dents and a partition wall therebetween and a height of a part of the partition wall relative to a bottom of each of the dents on an imaginary line along a shortest distance on the partition wall between adjacent dents is smaller than a height on another part of the partition wall not along the imaginary line, and wherein a thickness of the heat exchange wall between the first and second surfaces at the bottoms of the dents is larger than a thickness therebetween at a part of the partition wall on the imaginary line.

3. A heat exchanger for heat exchange between first and second fluids comprising:

a heat exchange wall having a first surface on which the first fluid flows and a second surface opposite said first surface on which the second fluid flows; wherein at least one of the first and second surfaces has at least two dents and a partition wall therebetween and a height of a part of the partition wall relative to a bottom of each of the dents on an imaginary line along a shortest distance on the partition wall between adjacent dents is smaller than a height on another part of the partition wall not along the imaginary line, and wherein a thickness of the heat exchange wall between the first and second surfaces at the bottoms of the dents is smaller than a distance therebetween at a part of the partition wall not on the imaginary line.

4. A heat exchanger for heat exchange between first and second fluids comprising:

a heat exchange wall having a first surface on which the first fluid flows and a second surface opposite said first surface on which the second fluid flows; wherein at least one of the first and second surfaces has at least two projections and a bottom therebetween and a depth of a part of the bottom on an imaginary line along the bottom representing a shortest distance between adjacent projections relative to tops of the adjacent projections is less than a depth of another part of the bottom not along the imaginary line relative to the tops of the adjacent projections, and wherein a thickness of the heat exchange wall between the first and second surfaces at the tops of the adjacent projections is larger than a thickness therebetween at a part of the bottom on the imaginary line.

\* \* \* \* \*